United States Patent
Vinogradov et al.

(10) Patent No.: US 11,720,763 B2
(45) Date of Patent: Aug. 8, 2023

(54) OPTICAL ARRANGEMENT IN MACHINE VISION SYSTEM WITH DIFFUSIVE AND DIRECT ILLUMINATION FOR DPM INDICIA

(71) Applicant: ZEBRA TECHNOLOGIES CORPORATION, Lincolnshire, IL (US)

(72) Inventors: Igor Vinogradov, Oakdale, NY (US); Eric Trongone, Coram, NY (US); Qing Tu, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/399,398

(22) Filed: Aug. 11, 2021

(65) Prior Publication Data

US 2021/0374369 A1 Dec. 2, 2021

Related U.S. Application Data

(63) Continuation of application No. 16/803,746, filed on Feb. 27, 2020, now Pat. No. 11,120,236.

(51) Int. Cl.
*G06K 15/02* (2006.01)
*G06K 7/10* (2006.01)

(52) U.S. Cl.
CPC ..... *G06K 7/10732* (2013.01); *G06K 7/10742* (2013.01); *G06K 7/10831* (2013.01); *G06K 7/10861* (2013.01); *G06K 7/10881* (2013.01)

(58) Field of Classification Search
CPC ........ G01S 17/89; G01S 17/931; G01S 17/10; G01S 7/4817; H01L 25/167

(Continued)

(56) References Cited

U.S. PATENT DOCUMENTS 5,756,981 A * 5/1998 Roustaei ............ G06K 7/10732
235/462.07
6,105,869 A * 8/2000 Scharf ................ G06K 7/10742
235/462.41

(Continued)

FOREIGN PATENT DOCUMENTS

JP 2011-59973 A 3/2011
WO 2018/209580 A1 11/2018

OTHER PUBLICATIONS

Office Action for German Patent Application No. 102021104464.2 dated Oct. 28, 2022.

*Primary Examiner* — Daniel St Cyr
(74) *Attorney, Agent, or Firm* — Yuri Astvatsaturov

(57) ABSTRACT

An apparatus for capturing an image of at least one object appearing in an imaging field of view (FOV). A housing has an imaging sensor operably coupled with the circuit board, the imaging sensor configured to capture an image frame appearing in the imaging FOV and defining an imaging axis. An illumination assembly has a plurality of light sources operably coupled with the circuit board, a diffuser positioned adjacent to the plurality of light sources, the diffuser configured to generate a diffused light pattern, and a light pipe positioned adjacent to the plurality of light sources to generate a direct illumination pattern and an off-axis illumination pattern, wherein the direct illumination pattern is oriented generally parallel to the imaging axis and the off-axis illumination pattern is configured to intersect the imaging axis.

17 Claims, 12 Drawing Sheets

(58) Field of Classification Search
USPC .................. 235/462.42, 462.09, 462.11, 454
See application file for complete search history.

(56) References Cited

U.S. PATENT DOCUMENTS

| | | | |
|---|---|---|---|
| 8,760,563 B2 * | 6/2014 | Koziol | G06K 7/10722 |
| | | | 348/335 |
| 9,329,332 B2 | 5/2016 | Gerst, III et al. | |
| 9,536,124 B1 | 1/2017 | Nunnink et al. | |
| 11,120,236 B1 * | 9/2021 | Vinogradov | G06K 7/10861 |
| 2010/0155485 A1 * | 6/2010 | Tan | G06K 7/10702 |
| | | | 235/462.42 |
| 2011/0101100 A1 * | 5/2011 | Roberts | G06K 7/10831 |
| | | | 248/346.03 |
| 2012/0038821 A1 * | 2/2012 | Gannon | H04N 5/2256 |
| | | | 348/373 |

* cited by examiner

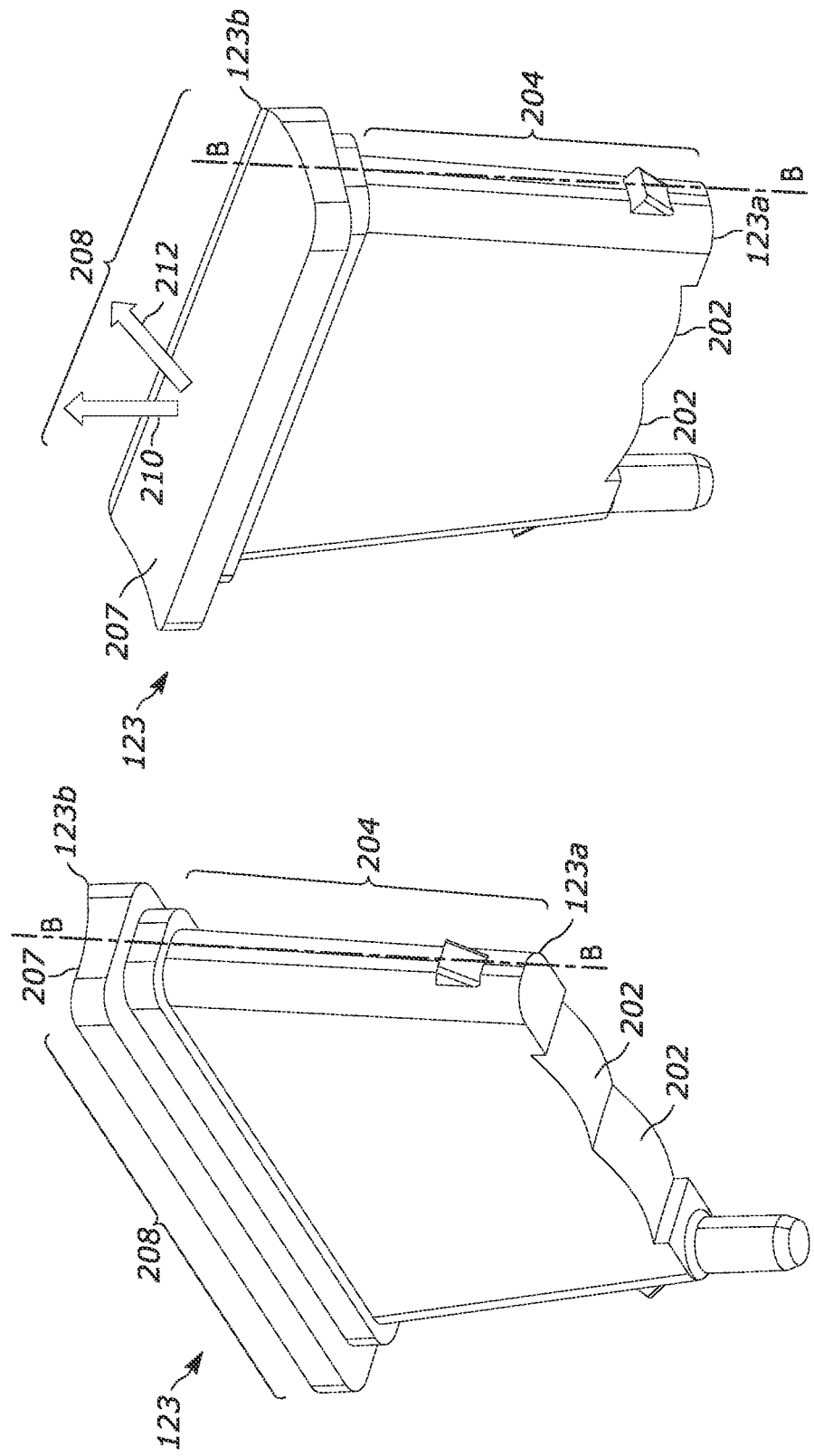

OPTICAL ARRANGEMENT IN MACHINE VISION SYSTEM WITH DIFFUSIVE AND DIRECT ILLUMINATION FOR DPM INDICIA

CROSS-REFERENCE TO RELATED APPLICATION

This application is a continuation of U.S. patent application Ser. No. 16/803,746, filed on Feb. 27, 2020, and incorporated herein by reference in its entirety.

BACKGROUND

Barcode and other scanning devices generally capture images within a given field of view (FOV). Barcode readers may be provided to be used at various fields of view and various distances from a target object. Typically, different distances and fields of view require different design requirements such as different intensities and types of illumination. In particular, reading direct part marking (DPM) barcodes requires diffusive illumination and, in some scenarios, off-axis illumination depending on the substrate that the DPM barcode is printed on. Systems may require greater illumination, or focused illumination, for objects at distances of 12 inches or further, compared to typical barcode scanning devices.

Typical barcode scanning illumination systems do not provide the versatility required to effectively read DPM barcodes that are printed on a wide variety of substrates, and at different distances. The differing design requirements oftentimes require different housing and component locations, different illumination sources, as well as additional components such as mirrors, lenses, and printed circuit boards.

Accordingly, there is a need for improved systems and/or accessories having improved functionalities.

SUMMARY

In an embodiment, an optical assembly is provided for capturing at least one image of an object appearing in an imaging field of view (FOV). The optical assembly comprises a circuit board, an imaging sensor operably coupled with the circuit board, and an illumination assembly. The imaging sensor is configured to capture an image frame appearing in the imaging FOV and additionally defines an imaging axis. The illumination assembly includes a plurality of light sources operably coupled with the circuit board, a diffuser positioned adjacent to the plurality of light sources, and a first light pipe positioned adjacent to the plurality of light sources. The plurality of light sources are configured to emit light to illuminate the object. The diffuser is configured to generate a diffused light pattern. The first light pipe is configured to generate a direct illumination pattern and an off-axis illumination pattern. The direct illumination pattern is oriented generally parallel to the imaging axis and the off-axis illumination pattern is configured to intersect the imaging axis.

In a variation of the current embodiment, the first light pipe includes a body having a first end and a second end and defining a longitudinal light pipe axis, an input surface positioned at the first end of the body, and an exit surface positioned at the second end of the body. The input surface is configured to be positioned adjacent to, and to receive the emitted light from, the plurality of light sources. The exit surface extends across a width of the first light pipe and includes a first exit surface portion and a second exit surface portion. The first exit surface portion is oriented generally perpendicular to the imaging axis and the second exit surface portion is oriented at an angle greater than approximately 85° relative to the imaging axis. The longitudinal light pipe axis of the body of the first light pipe is configured to be parallel to the imaging axis and wherein the exit surface is configured to direct the emitted light towards the object.

In some approaches, the input surface has a positive optical power. In these and other examples, the exit surface has a negative optical power. The input surface may include a plurality of converging lenses. Further, in some variations, the exit surface includes a first exit surface portion having a concave surface and a second exit surface portion having a convex surface being positioned adjacent to the first exit surface portion. The second exit surface portion may define a wedge.

In embodiments, the diffuser includes a diffusing body and a flange portion surrounding the diffusing body. The diffusing body may have a central region defining an opening dimensioned to be at least equal to the imaging FOV, and the central region extending from a first height to a second height to define a curved wall corresponding to the imaging FOV. The flange portion may include an opening configured to receive a portion of the first light pipe. In some forms, the first light pipe further includes a mounting member configured to operably couple the first light pipe with the diffuser.

In some examples, the imaging FOV includes an imaging FOV width and an imaging FOV height. The width of the first light pipe is configured to be positioned parallel to the imaging FOV width along the flange portion of the diffuser. In these and other examples, the assembly may further include a second light pipe positioned on the flange portion of the diffuser opposite the first light pipe.

In some approaches, the assembly may include eight optical sources to provide optical energy to the diffuser to generate diffuse illumination of the object, and at least two optical sources configured to provide optical energy to the light pipe to generate direct and indirect illumination of the object.

In accordance with a second aspect, a light pipe for use with a barcode reader having an illumination assembly configured to illuminate at least one object to be captured by an imaging assembly is provided. The light pipe includes a body having a first end and a second end and defining a longitudinal light pipe axis, an input surface positioned at the first end of the body, and an exit surface positioned at the second end of the body. The input surface is positioned adjacent to and receives emitted light from an illumination source of the imaging assembly. The exit surface includes a first exit surface portion and a second exit surface portion. The first exit surface portion is oriented generally perpendicular to the longitudinal light pipe axis and the second exit surface portion is oriented at an angle greater than approximately 85° relative to the longitudinal light pipe axis. The exit surface is configured to direct the emitted light towards the object. The body is configured to generate a direct illumination pattern and an off-axis illumination pattern at the exit surface, wherein the direct illumination pattern exits the exit surface at the first exit surface portion and the off-axis illumination pattern exits the exit surface at the second exit surface portion.

In accordance with a third aspect, a removable light directing assembly for use with an illumination assembly for illuminating at least one object to be captured by an imaging assembly is provided. The removable light directing assembly includes a first light pipe positionable adjacent to an illumination assembly to receive emitted light therefrom and a diffuser operably coupled with the first light pipe and being positionable adjacent to the illumination assembly. The first light pipe includes a body having a first end and a second end and defining a longitudinal light pipe axis. The first light pipe generates a direct illumination pattern oriented generally parallel to the longitudinal light pipe axis and an off-axis illumination pattern oriented at an angle greater than approximately 5° relative to the longitudinal light pipe axis. The diffuser generates a diffused light pattern.

In accordance with a fourth aspect, a light pipe is provided for use in a barcode reader having an illumination assembly configured to illuminate at least one object to be captured by an imaging assembly. The light pipe includes a first end having a plurality of convex input surfaces, a second end having an exit surface and a flange extending around the exit surface, and a central portion extending between the first end and the second end and defining a longitudinal light pipe axis. The exit surface extends across a width of the second end and defines a trough portion and a wedge portion. The exit surface is contoured such that a first portion of light received by the plurality of convex input surfaces exits at the exit surface in a direction generally parallel to the longitudinal light pipe axis and a second portion of light received by the plurality of convex input surfaces exits at the exit surface in a direction greater than approximately 5° relative to the longitudinal light pipe axis.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4A is a perspective view of an embodiment of a light pipe for use in an illumination system in a machine vision device in accordance with this disclosure.

FIG. 4B is a perspective view of an embodiment of a light pipe for use in an illumination system in a machine vision device in accordance with this disclosure.

Figure 1:
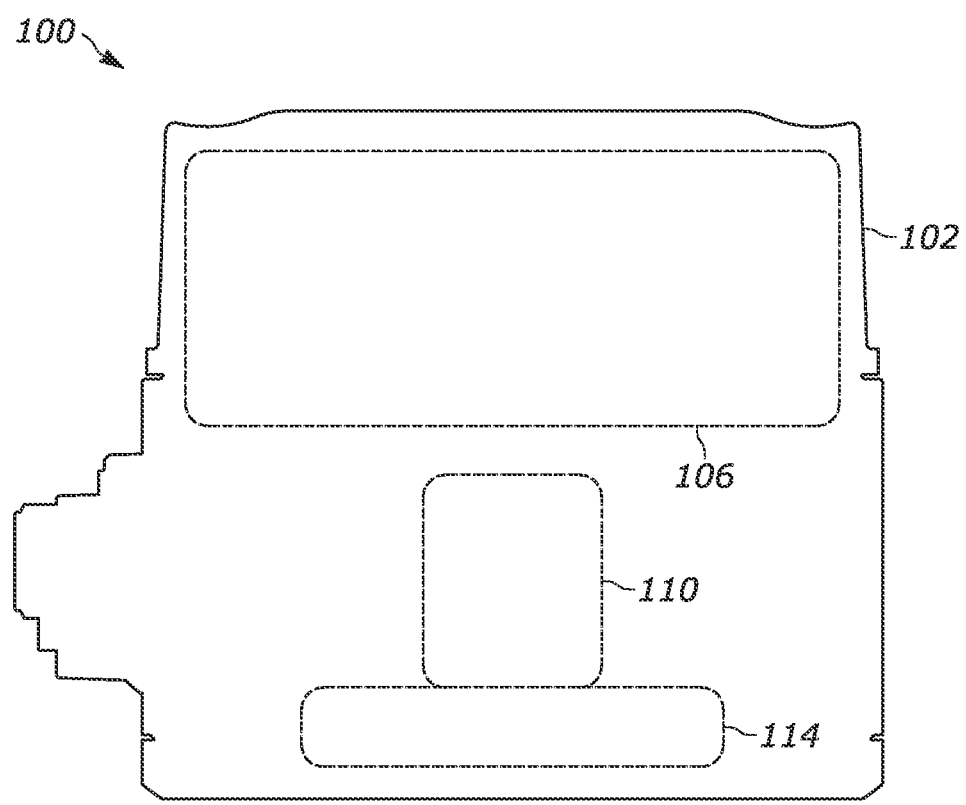
FIG. 1 illustrates a block diagram of an imaging-based machine vision device in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Portable high-performance optical imaging systems for machine vision employ small imaging sensors to maintain small form factors. For example, a typical machine vision imaging sensor has an imaging sensor rectangular area of around 6 by 6 millimeters with sensor pixels areas of approximately 3 microns. Some high-performance compact machine vision systems require wide-angle fields of view (FOVs) (e.g., greater than 40 degrees) in addition to small form factor imaging sensors. Different fields of view and distances of target objects for imaging require different intensities and types of illumination. Machine vision systems for imaging direct part marking (DPM) barcodes require diffusive illumination and, in some scenarios, off-axis illumination depending on the substrate that the DPM barcode is printed on. Systems may require greater illumination, or focused illumination, for objects at distances of 12 inches or further, compared to typical barcode scanning devices. The current disclosure describes a machine vision system that employs an illumination system that includes a diffuser and a light pipe that provide three types of illumination: (i) diffuse illumination, (ii) direct illumination, and (iii) indirect illumination, to a target object. The described machine vision system allows for robust measurements of multiple types of barcodes, and DPM barcodes, at a range of distances.

In an implementation, the present application provides an assembly for capturing at least one image of an object appearing in an imaging field of view (FOV). In various embodiments of the present disclosure the assembly includes a circuit board and an imaging sensor operably coupled with the circuit board, the imaging sensor configured to capture an image frame appearing in the imaging FOV and defining an imaging axis. The assembly further includes an illumination assembly having a plurality of light sources operably coupled with the circuit board, with the plurality of light sources configured to emit light to illuminate the object. The illumination assembly further includes a diffuser positioned adjacent to the plurality of light sources, the diffuser configured to generate a diffused light pattern; and a first light pipe positioned adjacent to the plurality of light sources to generate a direct illumination pattern and an off-axis illumination pattern, wherein the direct illumination pattern is oriented generally parallel to the imaging axis and the off-axis illumination pattern is configured to intersect the imaging axis. The diffuser and the first light pipe may cooperate to form a removable light directing assembly.

In implementations, the first light pipe includes a body having a first end and a second end and defining a longitudinal light pipe axis. The first light pipe further includes an input surface positioned at the first end of the body, the input surface configured to be positioned adjacent to, and to receive the emitted light from, the plurality of light sources. The first light pipe also has an exit surface positioned at the second end of the body extending across a width of the first light pipe, the exit surface including a first exit surface portion and a second exit surface portion, the first exit surface portion being oriented generally perpendicular to the imaging axis and the second exit surface portion being oriented at an angle greater than approximately 85° relative to the imaging axis. The longitudinal light pipe axis of the body of the first light pipe is configured to be parallel to the imaging axis and the exit surface is configured to direct the emitted light towards the object.

Turning to the figures, FIG. 1 illustrates a block diagram of an imaging-based machine vision device 100. The machine vision device 100 may be a direct part marking (DPM) barcode reader device, and accordingly, these terms may be used interchangeably herein. The device 100 includes a housing 102, an illumination assembly 106, an imaging assembly 110 disposed within the housing 102, and a sensor assembly 114. The illumination assembly 106 includes light sources, waveguides, and diffusers configured to provide for direct and indirect illumination of a target object. The imaging assembly 110 includes optics such as lenses, apertures, and other optics for imaging an image of the target object onto an imaging sensor. The sensor assembly 114 includes an imaging sensor (e.g., a photodiode array, CCD camera, etc.) and circuitry for receiving an image of the target object and generating an electrical signal indicative of the target object. In embodiments, the illumination assembly 106 may not be housed within the housing 102, and the illumination assembly 106 may be removable or detachable from the imaging assembly 106 and the sensor assembly 114.

Figure 2A:
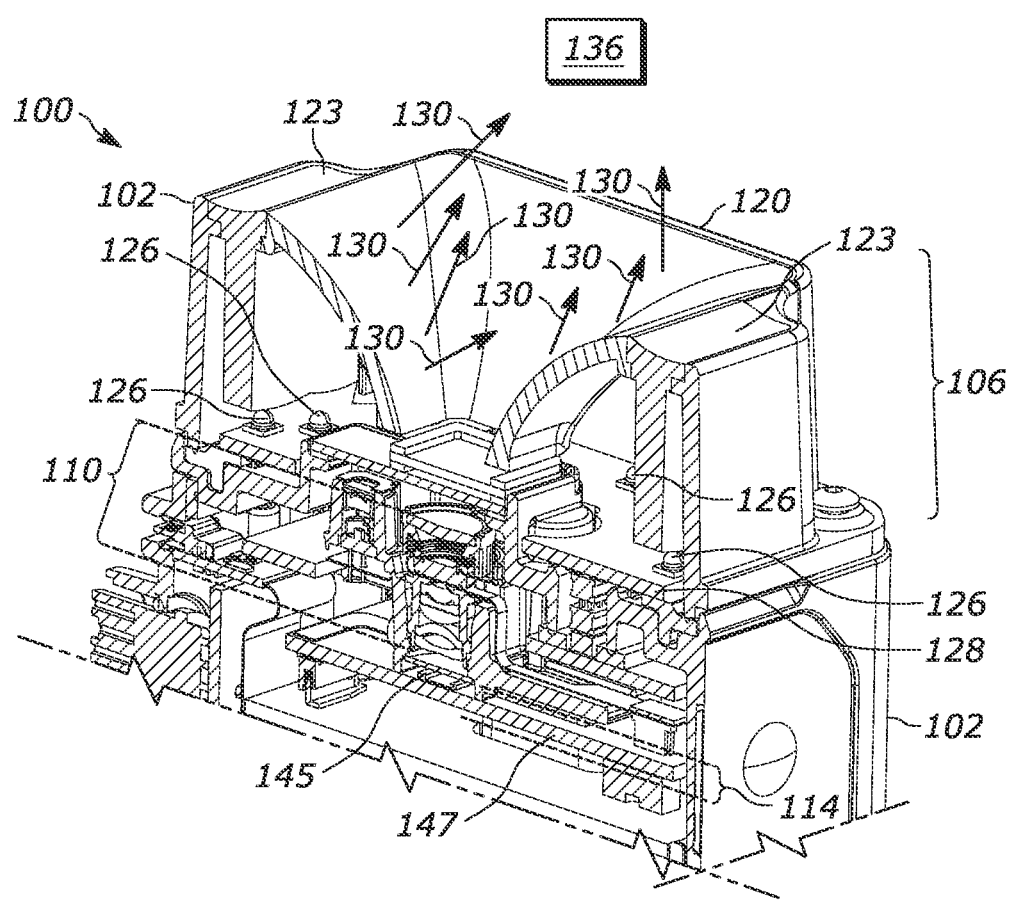
FIG. 2A is a side perspective cross sectional view of a machine vision device in accordance with this disclosure.
Figure 2B:
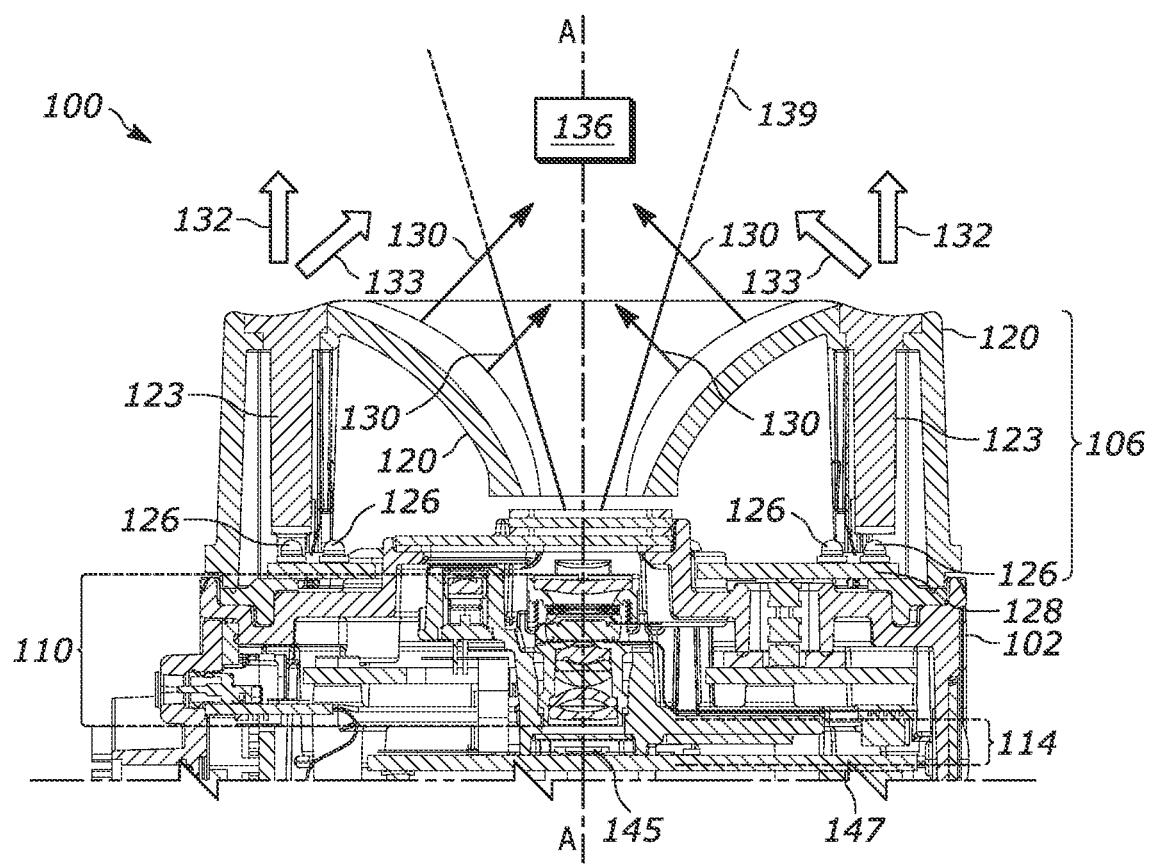
FIG. 2B is a side cross sectional view of the machine vision device of FIG. 2A in accordance with this disclosure.
Figure 2C:
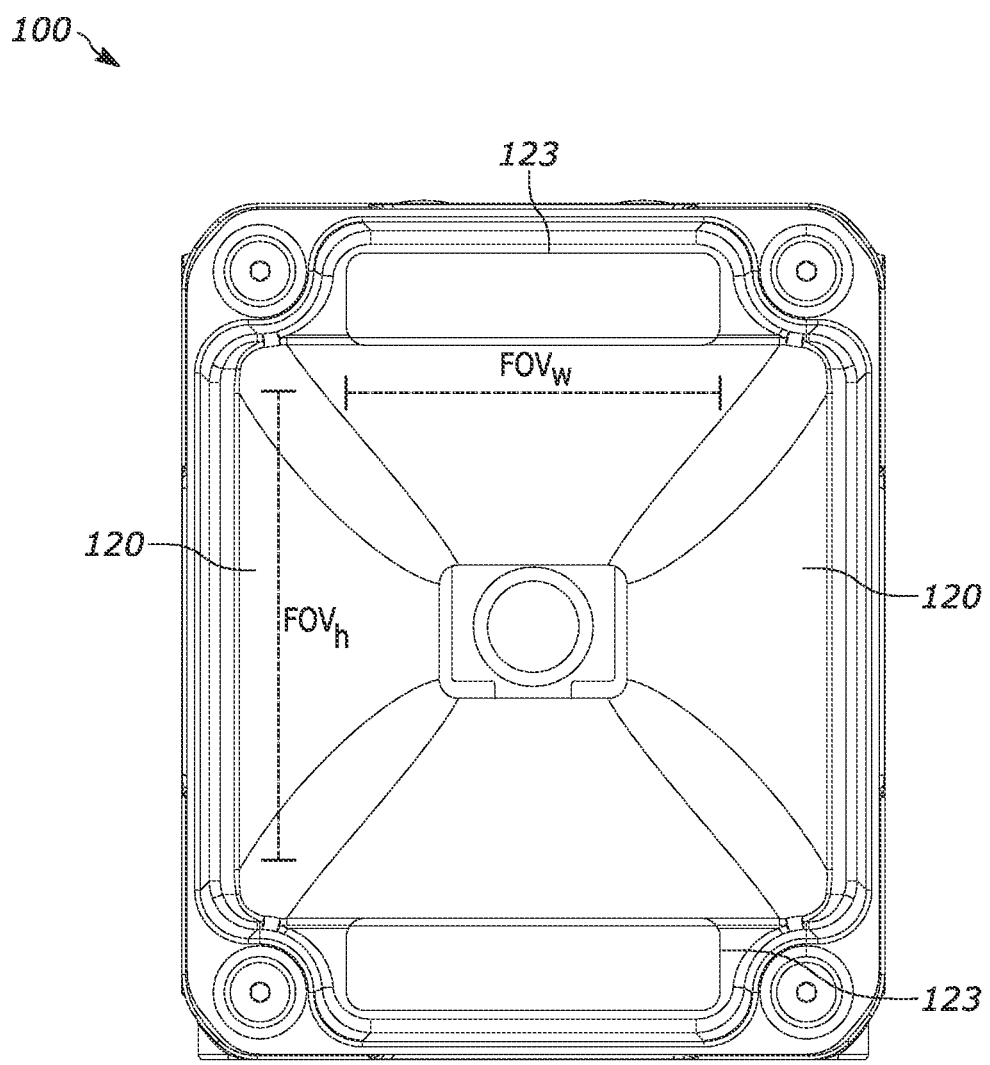
FIG. 2C is a top view of the machine vision device of FIG. 2A in accordance with this disclosure.

Referring now simultaneously to FIG. 1 and FIGS. 2A-2C. FIG. 2A is a side perspective cross sectional view of the machine vision device 100 of FIG. 1, FIG. 2B is a side cross sectional view of the machine vision device 100 of FIG. 1, and FIG. 2C is a top view of the machine vision device 100 of FIG. 1. The illumination assembly 106 of the machine vision device 100 includes a diffuser 120, one or more light pipes 123, a plurality of optical sources 126, and an illumination circuit board 128 for capturing an image of a target object 136 inside of a field of view 139 of the machine vision device 100. A portion of the plurality of optical sources 126 are configured to provide optical energy to the light pipes 123, while another portion of the plurality of the optical light sources are configured to provide optical energy to the diffuser 120. In embodiments, the optical sources 126 may include one or more of a light emitting diode, organic light emitting diode, laser diode, black body radiation source, ultraviolet radiation source, infrared radiation source, or another illumination source. In embodiments, the majority of the optical energy provided to the light pipes 123 and the diffuser 120 is provided in a manner such that the majority of the optical energy propagates through the light pipes 123 and diffuser 120, as described in more detail further herein. The diffuser 120 is configured to provide diffuse illumination (illustrated by arrows having reference numeral 130) to illuminate the target object 136 within the field of view 139 of the machine vision device 100. The light pipes 123 are optical waveguides configured to provide direct illumination 132 and off-axis illumination 133 to the target object 136. The illumination circuit board 128 is in electrical communication with the optical sources 126 to control the emission of optical energy from the optical sources to provide illumination to the target 136. For example, in embodiments, a controller may be in electrical communication with the optical sources 126 through busses or electrical lines of the illumination circuit board 128 to control the optical sources 126. In embodiments, the controller may be an external controller in electrical communication with the illumination circuit board 128 to control the optical sources 126, or the controller may be mounted directly on the illumination circuit board 128, such as alongside the optical sources 128, or on an underside, or side opposite the optical sources 126, of the illumination circuit board 128.

The imaging assembly 110 includes optical elements for imaging the target object 136 onto an image sensor 145 of the sensor assembly 114. In embodiments, the imaging assembly includes one or more aspheric lenses, glass lenses, variable focus lenses, spatial filters, optical filters, apertures, bandpass filters, highpass filters, lowpass filters, notch filters, chromatic filters, neutral density filters, or another type of lens or optical element. In embodiments, the imaging assembly may be configured to correct or mitigate chromatic dispersion, optical field curvature, coma, chromatic aberrations, and/or other optical field distortions. In any embodiments, the imaging assembly 110 is configured to allow for the image of the target object 136 to form correctly on the imaging sensor 145. Other configurations and/or components may be used.

The sensor assembly 114 includes an imaging sensor 145 and a sensor circuit board 147. The imaging sensor 145 is configured to receive an image of the target object 136 and to generate an electrical signal indicative of the image of the target object 136. The sensor circuit board 147 is communicatively coupled to the imaging sensor 145 to control the imaging sensor 145 for obtaining an image of the target object 136. The sensor circuit board 147 may include additional components such as a controller for controlling when to active the imaging sensor 145 to capture the image (i.e., an image frame) of the target object 136. Additionally, the sensor circuit board 147 may include one or more memories for storing the electrical signal indicative of the captured image, or for storing computer readable instructions for controlling the imaging sensor 145. Additionally, sensor circuit board may have input/output ports or otherwise be in communication with the illumination circuit board 128 to control the plurality optical sources 126. By controlling both the optical sources 126 and the imaging sensor 145, the plurality of optical sources 126, or a subset of the plurality of optical sources 126, may be activated only while the imaging sensor 145 is active, which may preserve energy and allow for lower power requirements for operation of the device 100. The sensor circuit board may include a communications module or input/output devices and ports for communicating with external systems, devices, and networks.

The imaging sensor 145 may have a plurality of photosensitive elements forming a substantially flat surface and may be fixedly mounted relative to the housing 102 using any number of components and/or approaches. The image sensor 112 further has a defined central imaging axis A that is normal to the substantially flat surface on a detection surface of the imaging sensor 112, with the detection surface being approximately at the imaging plane of the imaging assembly 110. In some embodiments, the imaging axis is coaxial with a central axis of the imaging assembly 110. The imaging assembly 110 may also be fixedly mounted relative to the housing 102 using any number of components and/or approaches. In the illustrated embodiment, the imaging assembly 110 is positioned between the illumination assembly 106 and the image sensor 112. The imaging assembly 110 may include one or more apertures to block light from objects outside of the field of view, which reduces imaging problems due to stray light from objects other than the target object. Additionally, the illumination circuit board 128 may include an aperture to reduce light from the optical sources 126 from entering the imaging assembly 110, and/or the imaging sensor 145. As described herein, direct illumination may be considered optical energy or illumination propagating substantially parallel to the imaging axis, and indirect illumination, or off-axis illumination, may be considered to be any optical energy propagating in a direction that intersects with the imaging axis.

The machine vision device 100 has an imaging field of view (FOV) for capturing image frames of the target object 136. The FOV has an FOV width FOVw, and an FOV height FOVh, illustrated in FIG. 2C, defined by the size of the sensor, optics of the illumination assembly 106, and any apertures along the imaging axis A.

In embodiments, the machine vision device 100 may include additional elements, or may be adapted to be inserted into a docking station with additional elements such as an AC power source to provide power for the machine vision device 100, or another computational device, external network, or communications module for communicating between the machine vision device 100 and external devices and systems. The machine vision device 100 may further include an onboard power supply such as a battery configured to supply power to the illumination circuit board 128 and the sensor circuit board 147. Additionally, the machine vision device 100 may include a memory and a controller that controls operation of the imaging system 110 (e.g., the optical sources 126 and the imaging sensor 145). In embodiments, the machine vision device 100 may include a trigger (not shown in the illustration) that is used to activate the device to capture an image. The machine vision device 100 may include any number of additional components such as decoding systems, processors, and/or circuitry coupled to the illumination circuit board 128, the sensor circuit board 147, and/or any other circuitry and circuit boards to assist in operation of the device 100.

Figure 3A:
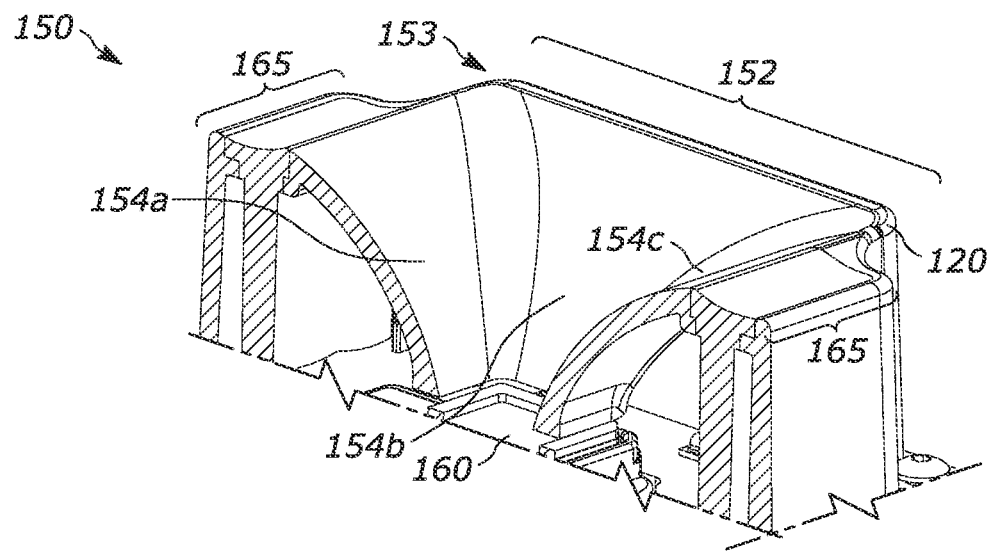
FIG. 3A is a perspective cut away view of an embodiment of a diffuser for an imaging-based machine vision device in accordance with this disclosure.
Figure 3B:
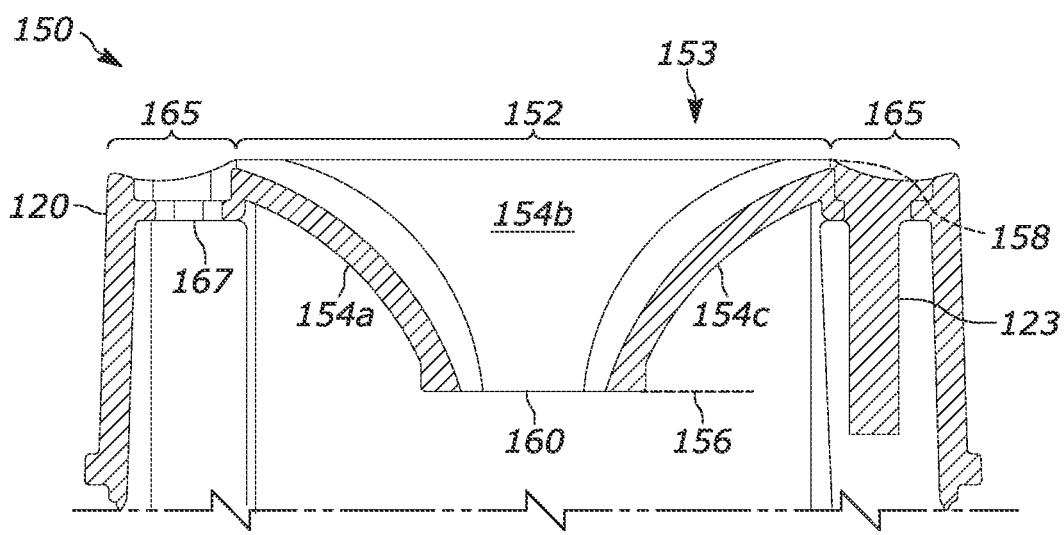
FIG. 3B is a perspective cut away view of an embodiment of a diffuser for an imaging-based machine vision device in accordance with this disclosure.

FIGS. 3A and 3B are perspective cut away view of an embodiment of a removable light directing assembly 150 which includes the diffuser 120 and the light pipe 123 of FIGS. 2A-2C. The diffuser 120 may include a diffusing body 152 and a flange portion 165. In the illustrated example, the diffusing body 152 includes four curved surfaces 154a, 154b, 154c (the fourth surface is not illustrated, but is to be understood to be included in discussions of the surfaces of the diffuser) that are in physical contact and cooperate to form a central region 153. The curved surfaces 154a-154c extend from a first height 156 (FIG. 3B) to a second height 158 (FIG. 3B) to form a wider aperture at the second height 158, and a narrower aperture 160 at the first height 156. Put differently, the wide aperture is positioned at a location away or distally from the imaging sensor 145 and the narrow aperture 160 is positioned at a location near or distally to the imaging sensor 145 compared to the wide aperture. The narrow aperture 160 may assist in reducing the amount of stray light that is received by the imaging sensor 145. Additionally, the narrow aperture may define the imaging FOV of the imaging sensor and machine vision system. The curvature of the surfaces 154a-154c of the diffuser 120 provide a substantially uniform light distribution for illumination of the target object 136. In embodiments, the curvature of the surfaces is generally cylindrical in shape with a radius of curvature of approximately 22.5 millimeters.

The diffuser 120 may be constructed from a plastic material, a glass material, a plastic polycarbonate, an acrylic material, or an otherwise transparent material for light from a subset of the plurality of optical source 126 to propagate therethrough. In embodiments, the diffuser 120 is constructed from a semi-transparent diffusive white plastic material and the light sources 126 are light emitting diodes (LEDs). In embodiments, the light sources 126 are approximately 23 millimeters from the closest segment of the surface of the diffuser 120. Configuring the light sources 126 to be positioned at substantially the same distance from the entire surface of the nearest surface of the diffuser 120 yields a more uniform illuminance of the diffuser surface, which further generates a more uniform luminance of the surface itself for illuminating the target object 136. In embodiments, the diffuser 120 may have roughened surfaces for dispersing, or diffusing light, for example there may be microlenses on the surfaces of the diffuser 120 for diffusing light. Additionally, the diffuser 120 may include diffusive elements within the surfaces of the diffuser 120 such as microbeads, small pockets of air, or another aberration configured to disperse and diffuse optical energy propagating through the diffuser 120. In any embodiment, the diffuser 120 is configured to receive light from a subset of the plurality of optical sources 126, diffuse the received light, and to provide diffuse illumination to the target object 136. Additionally, in embodiments, the diffuser 120 is configured such that light reflected by the target object 136 propagates through the wide and narrow aperture of the diffuser 120 and into the imaging assembly 110 to be received by the imaging sensor 145. The arrangement of the diffuser 120 relative to the positioning of the plurality of optical sources 126 aids in generating a substantially uniform illumination of the target object 136 and minimizes the formation of optical "hot spots".

The flange portion 165 of the diffuser 120 is a substantially flat, or slightly curved, portion having an opening 167 configured to receive a portion of the light pipe 123 therethrough. The flange portion 165 may hold one or more light pipes 123 in a position configured for the light pipes 123 to receive light from optical sources. In embodiments, the opening 167 may be configured such that the width of a light pipe 123 positioned in the opening is parallel to the FOV width FOVw, as illustrated in FIG. 2C. In embodiments, the flange portion 165 may include any number of openings such as, for example, one opening 167, two openings 167, or three or more openings 167 each of which being configured to receive a portion of one or more light pipes 123. As illustrated in FIG. 2C, and throughout this specification, a second light 123 pipe may be positioned in a flange portion 165b opposite the first light pipe 123 in an opposite flange portion 165 a in the diffuser 120.

FIGS. 4A and 4B are perspective views of an embodiment of the light pipe 123. The light pipe 123 has first and second input surfaces 202 at a first end 123a of the light pipe 123, a pipe region 204, and an exit surface 207 at a second end 123b of the light pipe 123. The pipe region 204 may also be referred to as the body of the light pipe 123 extending between the first and second surfaces 202 and 207, respectively at the first and second ends of the light pipe 123. Additionally, the light pipe 123 has a longitudinal light pipe axis B that extends along the length of the body 204 from the first end 123a of the light pipe 123 to the second end 123b thereof. Additionally, the light pipe 123 has a light pipe width 208. Light from optical sources, such as the optical sources 126 of FIGS. 2A-2C, enters the light pipe 123 through the input surfaces 202. In the illustrated example, the first and second input surfaces 202 have positive optical power, and a free form shape. In embodiments, the first and second input surfaces 202 may each be in the form of a surface having a positive curvature, or a lens with substantially positive optical power.

The exit surface 207 has a substantially cylindrical shape and includes two surface portions (discussed in further detail below), with one of the surface portions having an aspherical shape with a negative optical power, and the other surface portion being substantially flat. In embodiments, the exit surface 207 has an overall negative optical power. In the illustrated example, the curvature vertex of the exit surface 207 is offset from the center axis of the pipe region 204. In embodiments, the curvature vertex of the exit surface 207 is 2.4 mm off axis from the center of the light pipe 200. The exit surface 207 may further include a wedge to redirect a portion of the light toward the imaging axis of the imaging sensor 145 providing the off-axis indirect illumination 212. In embodiments, the exit surface 207, input surfaces 202, and/or side surfaces of the pipe region 204 may be textured of have diffuser elements to assist in scattering the light in preferred directions (i.e., toward the imaging axis of the imaging sensor 145). The pipe region 204 may be constructed from any plastic, glass, acrylic, or other material capable of passing or transmitting greater than approximately 50% of the light entering the input surfaces 202 to the output surface 207. In embodiments, the light pipe 123 is configured to transmit through the exit surface 207 at least approximately 95% of the light received at the input surfaces 202. As such, the pipe region 204 is an optical waveguide. The pipe region 204 is substantially rectangular with tapered sides, and the pipe region 204 guides the light through total internal reflection.

The pipe region 204 may be a substantially light transparent material, which, in embodiments, may include glass, plastic, an acrylic material, or another material having an index of refraction, and geometry, configured to guide light from the input surfaces 202 to the exit surface 207. Light exiting the exit surface 207 is emitted in two directions and/or patterns: a direct illumination pattern 210 is emitted substantially forward out of the light pipe 123 along the length axis of the pipe region 204, and an indirect illumination pattern 212 is emitted at an off-axis angle towards the imaging axis of the imaging sensor 145 to provide off-axis illumination. The direct illumination 210 may be useful for illuminating a target object that is at distances greater than approximately 5 or 6 inches from the imaging sensor 145, and may enable imaging of an object at distances of greater than 12 inches, while the indirect illumination 212 may be useful for illuminating target objects at distances of 6 inches or less from the imaging sensor 145. In embodiments, the pipe region 204 may be any optical waveguide configured to guide, transmit, or pass light from the first end 123a of the light pipe 123 to the second end 123b of the light pipe 123.

Figure 4C:
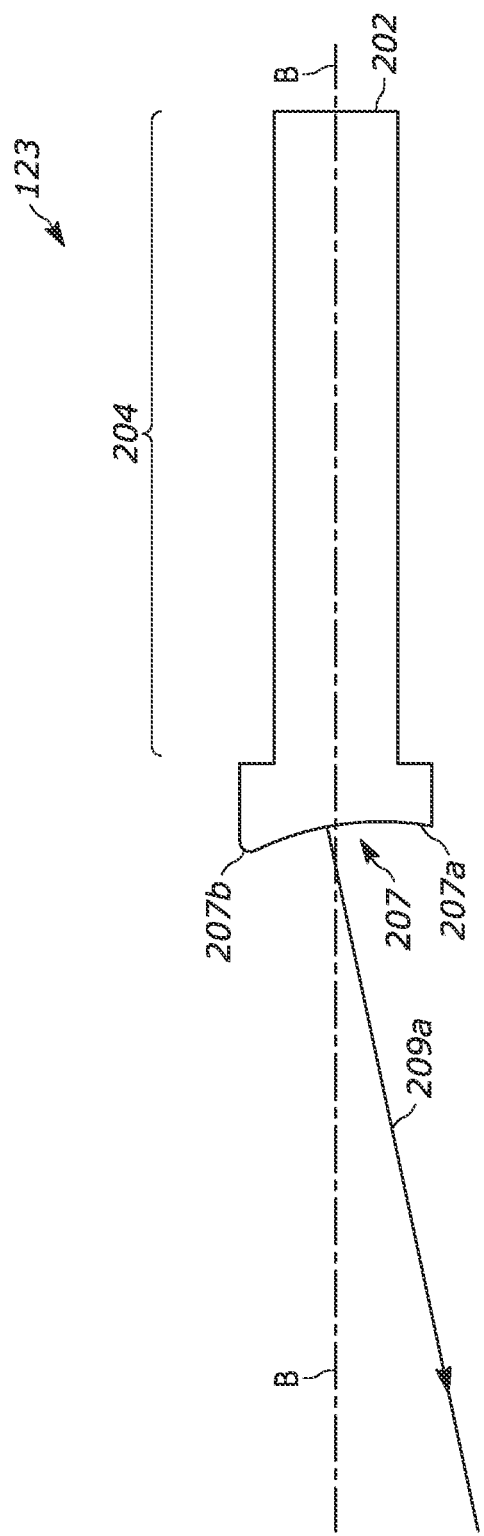
FIG. 4C illustrates a mechanical model of an embodiment of a light pipe in accordance with this disclosure.

FIG. 4C illustrates a mechanical model of an embodiment of the light pipe 123 having input surface 202, pipe region 204, and exit surface 207. Notably, the exit surface 207 has a first exit portion 207a and a second exit portion 207b. The first exit portion 207a is generally perpendicular to the light pipe axis B, is a concave, substantially cylindrical surface and has a radius of curvature 209a. In embodiments, the radius of curvature of the first exit portion 207a is approximately 13.3 millimeters. Other examples are possible. The concave first exit portion 207a may be considered a trough portion. As illustrated in FIG. 4C, the curvature of the first exit surface portion 207a is not centered on, or is off-axis from, the light pipe axis B, however, in other examples, the curvature of the first exit surface portion 207a may be centered on the light pipe axis B. In embodiments, the first exit surface portion 207a is configured to transmit at least approximately 40% of the light received at the input surface 202.

In embodiments, the second exit surface portion 207b is convex and is oriented at an angle of approximately greater than 85° relative to the longitudinal light pipe axis B and creates a wedge to assist in generating the off-axis illumination for illuminating a target object. In embodiments, the second exit surface portion 207b is configured to transmit at least approximately 40% of the light received at the input surface 202. Together, the first exit surface portion 207a and the second exit surface portion 207b cause the light to exit the exit surface 207 as both direct illumination for illuminating target objects farther than approximately 6 inches, and indirect illumination for illuminating target objects at distances of 6 inches or less. Additionally, the off-axis indirect illumination enables a barcode reader or machine vision system to better image DPM barcodes and/or markings. In embodiments, the input surface 202 may have an overall positive optical power, and the input surface 202 may include one or more converging lenses.

Figure 5A:
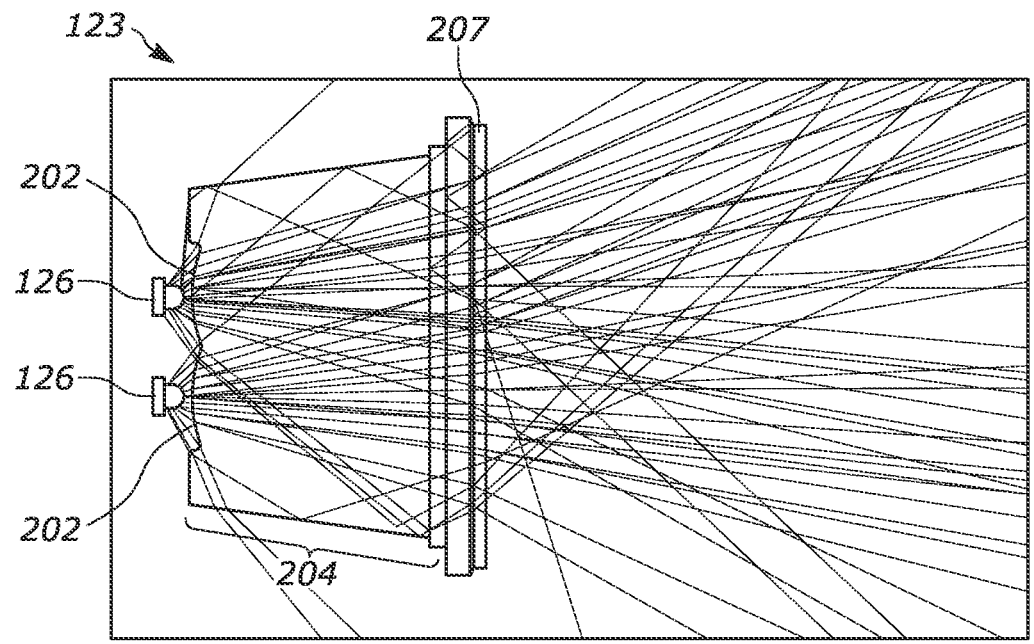
FIG. 5A is a top view of a ray trace diagrams of rays of light propagating through a light pipe in accordance with this disclosure.
Figure 5B:
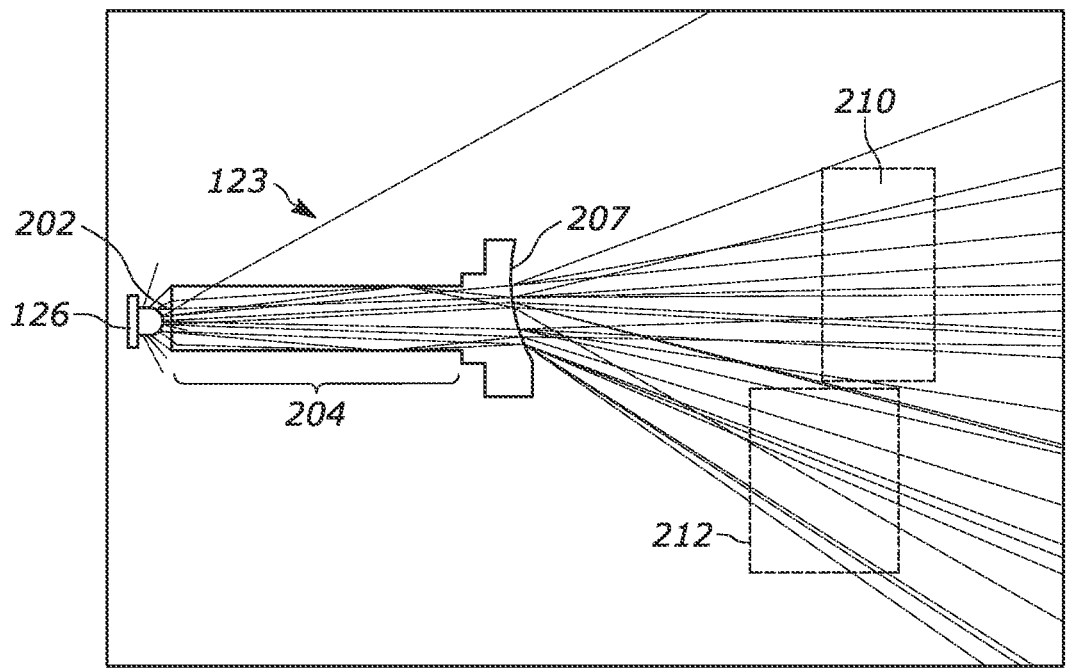
FIG. 5B is a side view of a ray trace diagrams of rays of light propagating through a light pipe in accordance with this disclosure.

FIGS. 5A and 5B are ray trace diagrams of rays of light propagating through the light pipe 123. Two optical sources 126 provide light to the first and second input surfaces 202. The input surfaces 202 are curved to provide focusing of the light into the pipe region 204 of the light pipe 123. The optical sources 126 are placed at a distance and location configured to focus the majority of the light emitted by the optical sources 126 into the light pipe 123. As illustrated in FIGS. 5A and 5B, the majority of the light that enters the light pipe 123 is contained by the light pipe body, or pipe region 204, and is totally internally reflected within the surfaces of the light pipe 123. The light is then emitted from the exit surface 207 as direct illumination 210 and indirect illumination 212, as described herein.

Figure 6:
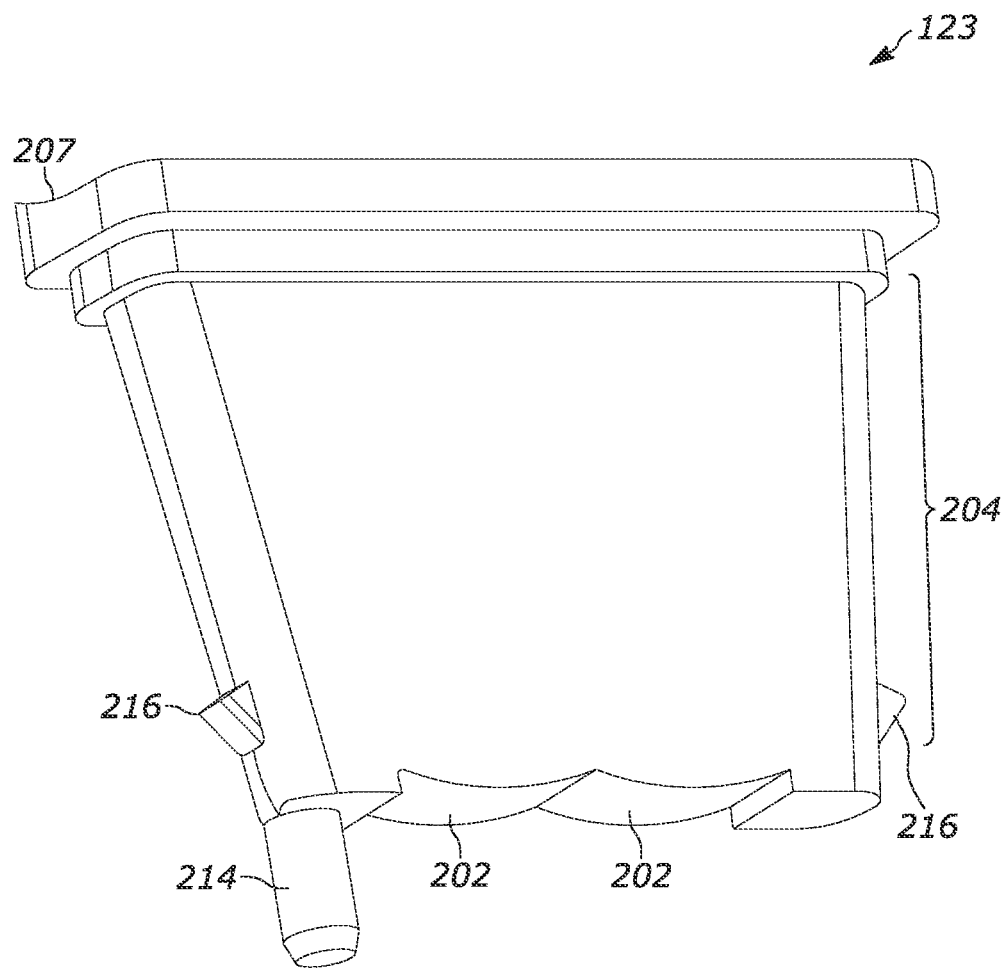
FIG. 6 is an illustration of an embodiment of a light pipe having additional features for implementation of a machine vision device in accordance with this disclosure.

With reference to FIG. 6, the light pipe 123 can additionally include a mounting member illustrated as a locating pin 214 and lock-in wedges 216 protruding from the light pipe 123. The locating pin 214 (i.e., a mounting member) fits into a corresponding mounting member, which may be in the form of a notch or opening in a housing and/or a diffuser, such as the housing 102 or diffuser 120. In embodiments, the locating pin 214 may physically couple to a mounting member in part fixedly attached to the housing 102 or diffuser 120. The locating pin 214 and notch ensure that the light pipe 123 is positioned relative to optical light sources to ensure efficient coupling of light from the optical light sources into the light pipe 123 through the input surfaces 202. The lock-in wedges 216 protrude from the sides of the light pipe 123 and are configured to clip onto or otherwise secure with a frame or light blocking shield, to prevent stray light from entering the light pipe 123, discussed further in reference to FIGS. 7A-7C.

Figure 7A:
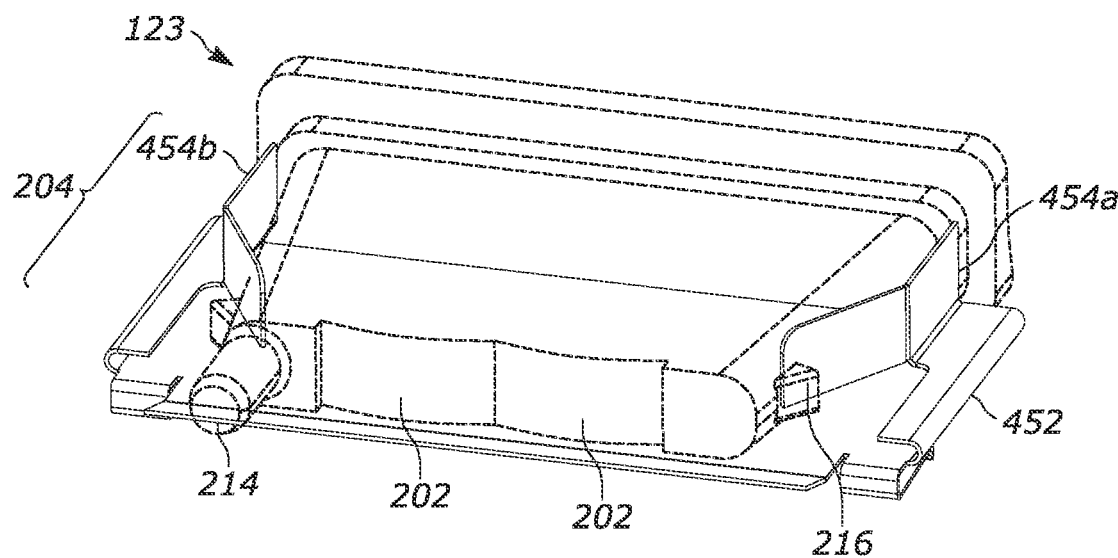
FIG. 7A is a perspective view of a light pipe physically coupled to a frame for implementation in a machine vision device in accordance with this disclosure.
Figure 7B:
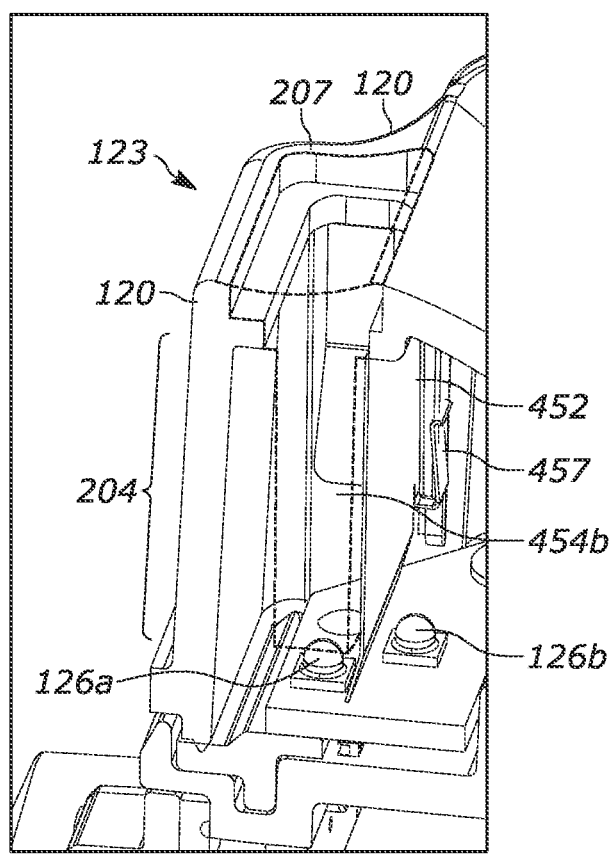
FIG. 7B is a perspective view of a light pipe physically coupled to a frame for implementation in a machine vision device in accordance with this disclosure.
Figure 7C:
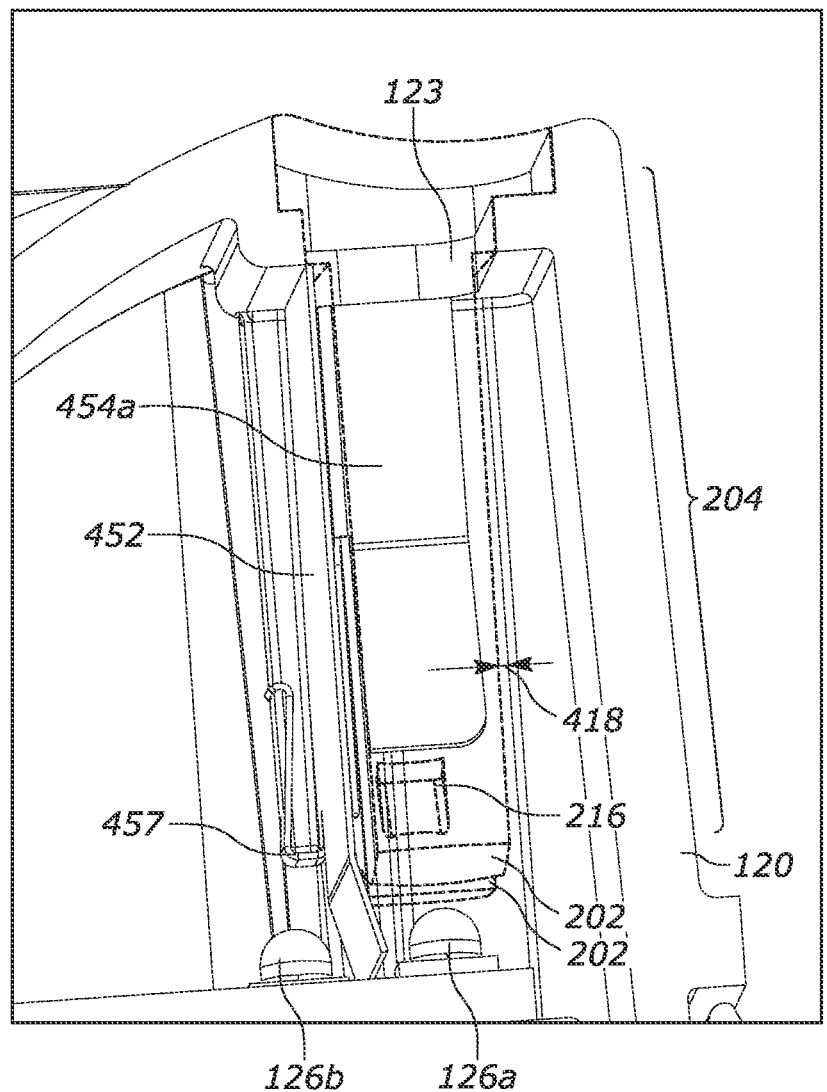
FIG. 7C is a perspective view of a light pipe physically coupled to a frame for implementation in a machine vision device in accordance with this disclosure.

FIGS. 7A-7C are perspective views of the light pipe 123 being coupled with a frame 450 for implementation in a machine vision device, such as the machine vision device 100. In embodiments, the frame 450 includes a back panel 452, and a first and second side panel 454a and 454b, and a latch 457. The back panel 452 acts as an isolating shield, isolating shield member, or light blocking preventing light from undesirable optical sources from entering the light pipe 123. In embodiments, the entire frame 450, or the back panel 452 of the frame 450, may be a metal, a cloudy or opaque plastic, an opaque glass, a synthetic material, or another opaque material capable of blocking stray light from reaching the light pipe 123 and entering into the light pipe 123. In embodiments, as FIG. 7B illustrates, the frame 450 may be physically coupled with the light pipe 123 with the frame 450 clipping to, snapping onto, or otherwise attaching to the light pipe. The light pipe 123 and frame 4550 may then be inserted into the diffuser 120 as illustrated in FIGS. 7B, and 7C. In embodiments, the light pipe 123 may be physically coupled to the diffuser 120 before the frame 450 is physically attached to the light pipe 123. For example, the light pipe 123 may be physically coupled to the diffuser 120 by two shot molding, an adhesive, a tape, or another coupling method. The light pipe 123, frame 450, and diffuser 120 may then be positioned by the locating pin 214, as previously described in reference to FIG. 6, to be physically configured relative to an optical source 126a to receive light from the optical source 126a through input surfaces 202, and for the diffuser 120 to receive light from the optical sources 126b, as further described in reference to FIG. 8. The light may then propagate through the pipe region 204 of the light pipe 123, and exit the light pipe 123 through the exit surface 207. The back panel 452 may be positioned between the light pipe 123 and the nearby diffuser to prevent light from the optical source 126a from reaching the nearby diffuser 120. Additionally, a nearby second optical source 126b may provide light to the nearby diffuser 120, and the back panel 452 may prevent light from the second optical source 126b from reaching the light pipe 123. In embodiments, the light pipe 123 is physically positioned by the locating pin 214, coupled with the diffuser 120. For example, in embodiments, the locating pin 214 may snap into, or fit into a crevice of the diffuser 120 to hold the location pin 214, and therefore light pipe 123 and frame 450, in a desired location relative to the illumination circuit board 128 and optical sources 126.

In embodiments, the frame 450 may be physically secured to the light pipe 123 by one or more wedges 216 of the light pipe 123. The one or more wedges 216 may latch, or snap fit, onto the first and/or second side panel 454a and 454b to secure the frame 450 into place. The side panels 454a and 454b may be resiliently flexible such that they may bend as frame 450 is being attached to the light pipe 123. In embodiments, the diffuser 120 and the locating pin 214 position the light pipe 123 at a distance 418 from an outer wall of the diffuser 120. The distance 418 allows for an air layer to be present between the light pipe 123 and the diffuser 120 to prevent light from leaking out of the light pipe 123 into the diffuser 120. The amount of light leakage from the light pipe 123 to the diffuser 120 depends on the type of materials used to fabricate the light pipe 123 and the diffuser 120, and specifically on the indices of refractions of those materials. Additionally, in embodiments, there may be a gap between the light pipe 123 and the first and second side panels 454a and 454b of the frame 450. For example, as illustrated in FIG. 7A, the first and second side panels 454a and 454b may only come into contact with the light pipe 123 at or near the lock-in wedges 216 to secure the frame 450 to the light pipe 123. The majority of the first and second side panels 454a and 454b may not be in physical contact with the light pipe 123 to prevent light from leaking out of the light pipe 123. In embodiments, the latch 457 may physically couple the frame 450 to the diffuser 120 to control the width of a gap between the back panel 452 of the frame 450 and the light pipe 123.

Figure 8:
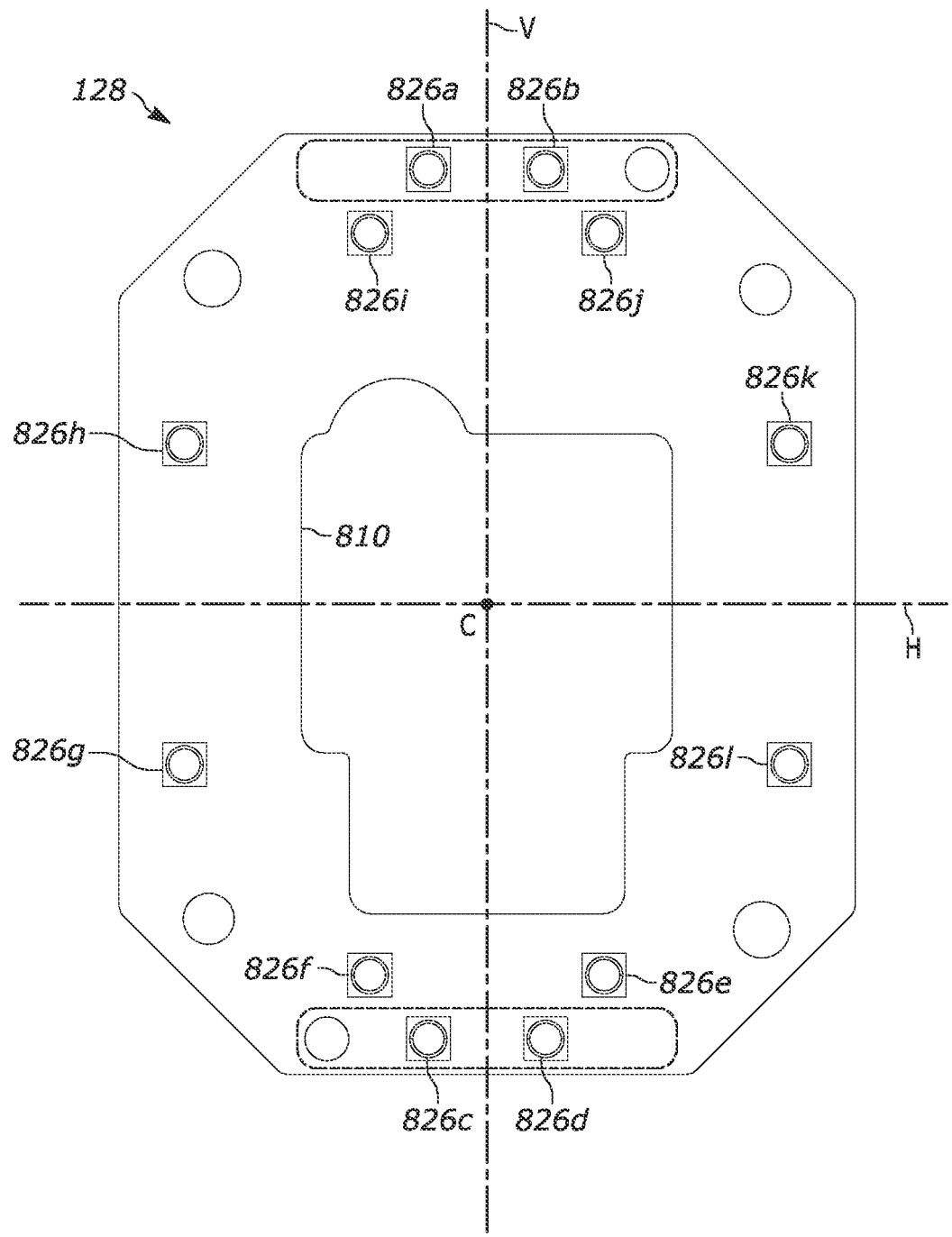
FIG. 8 is top perspective view of an embodiment on an illumination circuit board for use in an illumination system for a machine vision device in accordance with this disclosure.

FIG. 8 is top perspective view of an embodiment of the illumination circuit board 128 and includes similar features thereto. The illumination circuit board 128 includes optical light sources 826a-1 to provide light to a diffuser and a light pipe as described herein. The light sources 826a-1 may be one or more of an LED, a laser diode, an organic LED, a black body source, or another radiation source for generating light. The light sources 826a-1 are spatially configured such that a subset of the light sources 826a-1 supply optical power to one or more light pipes, and a complimentary set of the light sources 826a-1 supplies optical power to the diffuser. For example, as illustrated in FIG. 8, the four light sources 826a-826d are spatially configured to provide optical power to two light pipes represented by the dotted lines around the two sets of light sources 826a with 826b, and 826c with 826d. The rest of the light sources 826e-l are spatially configured to provide optical power to the diffuser. As described herein, a frame physically coupled to the light pipes may provide a barrier between the sets of light sources providing light to the light pipe and the light sources providing optical power to the diffuser. For example, a barrier may be present between the set of light sources 826a-826b, and the set of light sources 826i-826j, to prevent light from the set of light sources 826a-826b from reaching the diffuser, and similarly, to prevent light from the light sources 826i-826j from reaching the light pipe.

In embodiments, the specific locations of the light sources 826a-826l may be integral to generate substantially evenly distributed diffuse light from the diffuser, and to couple enough light into the light pipes to generate the direct and indirect illumination at output surfaces of the light pipes. In embodiments, the illumination circuit board 128 has a central aperture 810 with a center C defined by the intersection of a vertical axis V and a horizontal axis X of the circuit board 128. The central aperture allows light reflected from a target object to propagate through for imaging of the target object. In embodiments, the optical source 826k may be at a distance of approximately 20.65 mm away from the vertical axis V in a direction to the right of the vertical axis, and a distance of 10.95 mm above the horizontal axis H, resulting in the optical source 826k being at a radial distance of approximately 23.37 mm away from the center C as illustrated in FIG. 8. Other optical light sources may be similarly spatially configured, such as the light sources 826h, 826g, and 826l on the illumination circuit board 128 at the same radial distance from the center C in different quadrants as defined by the vertical and horizontal axes V and H. In embodiments, the optical source 826j may be at a distance of approximately 8 mm to the right of the vertical axis V, and approximately 25.35 mm above the horizontal axis H, resulting in the optical source 826j being a radial distance of approximately 26.58 mm from the center C, as illustrated in FIG. 8. Similarly, optical sources, such as the light sources 826i, 826f, and 826e, may be spatially configured on the illumination circuit board 128 at the same radial distance from the center C in different quadrants as defined by the vertical and horizontal axes V and H.

The light sources 826e-826l are the set of light sources that provide illumination to the diffuser. The number of optical light sources and the spacing of the light sources 826e-826l is crucial for generating a substantially even diffuse illumination for imaging of a target object. Additionally, in embodiments, the distance between the light sources 826e-826l and the surfaces of the diffuser should be great enough such that the light is substantially diffused by the diffuser, and small enough such that enough of the light from the light sources 826e-826l reaches the diffuser.

Returning to FIG. 8, in embodiments, the optical source 826b may be at a distance of approximately 4 mm to the right of the vertical axis V, and approximately 29.7 mm above the horizontal axis H, resulting in the optical source 826j being a radial distance of approximately 29.97 mm from the center C, as illustrated in FIG. 8. Similarly, light sources, such as the light sources 826a, 826c, and 826d, may be spatially configured on the illumination circuit board 128 at the same radial distance from the center C in different quadrants as defined by the vertical and horizontal axes V and H. The light sources 826a-826d are the set of light sources that provide illumination to the light pipes. The light sources 826a and 826b provide optical energy to a first light pipe, and the light sources 826c and 826d provide optical energy to a second light pipe. The distance from the light sources 826a-826d to an input surface of the light pipes is such that a majority (e.g., greater than 50%, greater than 75% or greater than 90%) of the optical energy emitted by the light sources 826a-826d enters the light pipes through the input surfaces.

The illumination circuit board 128 may include other components for operation such as electrical leads, printed bus lines, diodes, capacitors, inductors, memory, controllers, processor, amplifiers, or any other electrical components for controlling the operation of the light sources 826a-1.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A removable light directing assembly for use with an illumination assembly for illuminating at least one object to be captured by an imaging assembly, the removable light directing assembly including:
   a first light pipe positionable adjacent to an illumination assembly to receive emitted light therefrom, the first light pipe including a body having a first end and a second end and defining a longitudinal light pipe axis, the first light pipe configured to generate a direct illumination pattern oriented generally parallel to the longitudinal light pipe axis and an off-axis illumination pattern oriented at an angle greater than approximately 5° relative to the longitudinal light pipe axis; and
   a diffuser operably coupled with the first light pipe and being positionable adjacent to the illumination assembly, the diffuser configured to generate a diffused light pattern,
   wherein the first light pipe includes:
      an input surface positioned at the first end of the body, the input surface configured to be positioned adjacent to the illumination assembly to receive illumination therefrom; and
      an exit surface positioned at the second end of the body, the exit surface including a first exit surface portion and a second exit surface portion, the first exit surface portion being oriented generally perpendicular to the longitudinal light pipe axis and the second exit surface portion being oriented at an angle greater than approximately 85° relative to the longitudinal light pipe.

2. The removable light directing assembly of claim 1, wherein the input surface has a positive optical power.

3. The removable light directing assembly of claim 2, wherein the input surface includes a plurality of surfaces each having a positive optical power.

4. The removable light directing assembly of claim 2, wherein the second exit surface portion defines a wedge.

5. The removable light directing assembly of claim 1, wherein the exit surface has a negative optical power.

6. The removable light directing assembly of claim 5, wherein the first exit surface portion has a concave surface and the second exit surface portion has a convex surface positioned adjacent to the first exit surface portion.

7. The removable light directing assembly of claim 1, wherein the diffuser includes a body having a curved surface defining an opening and a flange portion surrounding the curved surface.

8. The removable light directing assembly of claim 7, wherein the flange portion includes a flange opening configured to receive a portion of the first light pipe.

9. The removable light directing assembly of claim 8, wherein the first light pipe further includes a mounting member to operably couple the first light pipe with the diffuser.

10. The removable light directing assembly of claim 7, further comprising a second light pipe positioned opposite the first light pipe on the flange portion of the diffuser.

11. The removable light directing assembly of claim 1, further comprising an isolating shield member disposed between the first light pipe and the diffuser.

12. A light pipe for use in a barcode reader having an illumination assembly configured to illuminate at least one object to be captured by an imaging assembly, the light pipe including:
   a first end having a plurality of convex input surfaces;
   a second end having an exit surface and a flange extending around the exit surface, the exit surface extending across a width of the second end and defining a trough portion and a wedge portion; and
   a central portion extending between the first end and the second end and defining a longitudinal light pipe axis;
   wherein the exit surface is contoured such that a first portion of light received by the plurality of convex input surfaces exits at the exit surface in a direction generally parallel to the longitudinal light pipe axis and a second portion of light received by the plurality of convex input surfaces exits at the exit surface in a direction greater than approximately 5° relative to the longitudinal light pipe axis.

13. The light pipe of claim 12, wherein the exit surface is configured to transmit at least approximately 40% of the emitted light received by the plurality of convex input surfaces as direct illumination to the object.

14. The light pipe of claim 12, wherein the exit surface is configured to transmit at least approximately 40% of the emitted light received by the plurality of convex input surfaces as indirect illumination to the object.

15. The light pipe of claim 12, wherein the input surface has a positive optical power.

16. The light pipe of claim 12, wherein the exit surface has a negative optical power.

17. The light pipe of claim 12, wherein the trough portion includes a concave surface and the wedge portion includes a convex surface.

* * * * *